United States Patent
Takahashi

(10) Patent No.: US 6,697,859 B1
(45) Date of Patent: *Feb. 24, 2004

(54) APPARATUS, METHOD, PROGRAM, AND INFORMATION PROCESSING SYSTEM FOR PRIORITIZED DATA TRANSFER TO A NETWORK TERMINAL

(75) Inventor: Kinya Takahashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/276,511

(22) Filed: Mar. 25, 1999

(30) Foreign Application Priority Data

Mar. 30, 1998 (JP) .......................... 10-099951

(51) Int. Cl.⁷ .............................. G06F 15/173
(52) U.S. Cl. ................... 709/225; 709/217; 709/219; 709/232
(58) Field of Search ................. 709/217, 219, 709/225, 232; 707/2, 500, 501, 513, 514, 515

(56) References Cited

U.S. PATENT DOCUMENTS

| 5,675,721 A | * | 10/1997 | Freedman et al. | ......... 345/502 |
|---|---|---|---|---|
| 5,778,372 A | * | 7/1998 | Cordell et al. | ......... 707/100 |
| 5,826,031 A | * | 10/1998 | Nielsen | ......... 709/233 |
| 5,987,466 A | * | 11/1999 | Greer et al. | ......... 707/10 |
| 6,195,679 B1 | * | 2/2001 | Bauersfeld et al. | ......... 709/203 |
| 6,263,364 B1 | * | 7/2001 | Najork et al. | ......... 709/217 |
| 6,269,403 B1 | * | 7/2001 | Anders | ......... 709/231 |
| 6,507,872 B1 | * | 1/2003 | Geshwind | ......... 709/236 |

\* cited by examiner

*Primary Examiner*—Saleh Najjar
(74) *Attorney, Agent, or Firm*—Fitzpatrick, Cella, Harper & Scinto

(57) ABSTRACT

In an information processing system in which a server supplying document data and a client requesting the server to transfer the document data are connected via a network, the server assigns priorities to respective data constituting the document data. When the client requesting the transfer of a particular document datum detects the presence of a plurality of data embedded in the document data or linked to the document data, the client further requests the transfer of a plurality of such data. Upon receipt of the request for the transfer of a plurality of data, the server transfers the respective data in order of precedence, starting with a datum with the highest priority among the data. This enables the client to obtain data with higher priorities sooner. Further, even if a line is disconnected in the middle of transfer, the amount of data that must be reread by restoring the line connection can be minimized.

11 Claims, 5 Drawing Sheets

APPARATUS, METHOD, PROGRAM, AND INFORMATION PROCESSING SYSTEM FOR PRIORITIZED DATA TRANSFER TO A NETWORK TERMINAL

BACKGROUND OF THE INVENTION

1. Field of the Invention

The present invention relates primarily to a data transfer apparatus, a data transfer method, and an information processing system and, more particularly, to a data transfer apparatus such as a server machine in a client-server system, a data transfer method and a program for data transfer or the like from a server machine to a client machine, and an information processing system such as a client-server system.

2. Related Background Art

In recent years, increasing efforts have been put into the development of client-server systems as the information processing systems for use on internets or other types of networks. A client-server system is configured so that a server machine (hereinafter referred to as a "server") retains and manages major data in a unified manner and a client machine (hereinafter referred to as a "client") can access such data at any time. For example, when a server and a client are connected on an internet for the purpose of accessing information by a world wide web (WWW), which serves as a wide area information system, a server creates document data in a hypertext described in a hyper text markup language (HTML), while the client receives the document data by means of a communication protocol called "hyper text transfer protocol" (HTTP). Thus the document data is displayed on a display unit of the client.

Most document data transferred from the server to the client are usually composed of a plurality of objects including embedded objects and linked objects. More specifically, as shown in FIG. 8, for example, a page A is composed of an embedded object b and c, and the data on a page D to which the page A is linked, i.e., a link object d, in addition to a main text a indicative of main contents. Furthermore, the page D to which the link object d is linked frequently has an embedded object f in addition to a main text e.

In general, the embedded objects b and c, or the link object d are retained in a separate file from that on the page A. Hence, in many cases, the portion corresponding to the embedded objects b and c, or the link object d in the page A includes only the information for referring to the embedded objects b and c, or the link object d. For this reason, the data on the page A is sequentially transferred time-wise from the server to the client according to the procedure illustrated in FIG. 9.

More specifically, when the client issues a connection request to the server and the connection between the client and the server is implemented, the client first reads in all data contained in the page A, then analyzes the contents of the data to check for the presence of the embedded objects b and c, or the link object d. The client then issues three connection requests to the server at the same time in order to read in the embedded objects b and c, and the data on the page D to which the link object d is to be linked that are retained in a separate file.

On the other hand, data transfer from the server to the client on the network is performed on a basis of packet of a predetermined length of data. Therefore, to implement data transfer to a plurality of connections (three connections in this case), the network is evenly used for the respective connections, the embedded objects b and c, and the data on the page D are read in time-sharing mode.

To be more specific, when each datum consists of three packets, as shown in FIG. 9, an embedded object b1, an embedded object c1, and data D1 on the page D are first read in sequence into the client. Then, an embedded object b2, an embedded object c2, and data D2 on the page D are read in, and further, an embedded object b3, an embedded object c3, and data D3 on the page D are read in. When all the data on the page D that is divided into three sections has been read in, the client issues a connection request to the server in order to read in an embedded object f that is embedded in the page D and retained in a separate file from that of the page D.

Page A and the embedded object f are also transferred from the client to the server by being divided in a plurality of sections based on packets. There is no other network connected to the server at the same time, so that the network is monopolistically used for transferring the data.

In the data transfer method described above, however, the embedded objects b and c, and the data on the page D to which the link object d is to be linked are read in sequence according to the reading order in units of packets, so that no particular portion of data can be preferentially taken out. For example, the embedded objects b and c may be image data providing cut-in illustration for decorating the main text a of the page A. In such a case, a request for giving a higher priority to referring to the main text e of the page D than the embedded objects b and c may be made. Since the conventional data transfer method is adapted to read data on a basis of packet in the time-sharing mode as discussed above, it has been impossible to refer preferentially to the data of the main text e of greater significance.

The use of networks based on radio transmission has been becoming widespread these days; however, disconnection of lines during data transfer based on the radio transmission may happen due to radio waves failing to reach in the middle of transfer. In this case, if, for example, the line between a client and a server is disconnected at time T1 of FIG. 9, then the client must send a request for reconnection to the page D to the server so as to read the data of the page D, or restart from reading the data of the page A, depending on a situation, thus posing a problem of inconvenience.

SUMMARY OF THE INVENTION

Accordingly, it is an object of the present invention to provide a data transfer apparatus, a data transfer method, and an information processing system that are capable of preferentially acquiring data of greater significance.

It is another object of the present invention to provide a data transfer apparatus, a data transfer method, and an information processing system that are capable of obviating the need of reconnection for rereading as much as possible even if a line is disconnected in the middle of communication.

According to one aspect, the present invention which achieves these objectives relates to a data transfer apparatus including: priority setting means for assigning a priority to each of a plurality of transferable data; and transfer means for transferring a plurality of data for which a transfer request has been issued to a terminal according to an order based on the priorities assigned to the respective data by the priority setting means.

According to another aspect, the present invention which achieves these objects relates to a data transfer method including the steps of: assigning a priority to each of a plurality of transferable data; and transferring a plurality of data for which a transfer request has been issued to a terminal according to an order based on the priorities assigned to the respective data.

According to still another aspect, the present invention which achieves these objectives relates to a computer-readable storage medium storing a data transfer program for controlling a data transfer apparatus to perform data transfer to a terminal via a network, the program including codes for causing the computer to perform the steps of assigning a priority to each piece of a plurality of transferable data, and transferring a plurality of data for which a transfer request has been issued to a terminal according to an order based on the priorities assigned to respective data.

According to yet another aspect, the present invention which achieves these objectives relates to an information processing system having a data transfer apparatus and a terminal connected via a network, wherein: the data transfer apparatus includes priority setting means for assigning a priority to each of a plurality of transferable data, transfer means for transferring a plurality of data for which the terminal has issued a transfer request to the terminal according to an order based on the priorities assigned to the respective data by the priority setting means; and the terminal includes requesting means for issuing a request for transfer of a plurality of data to the data transfer apparatus, and receiving means for receiving data transferred from the data transfer apparatus.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

A preferable embodiment in accordance with the present invention will be described in detail with reference to the accompanying drawings.

Figure 1:
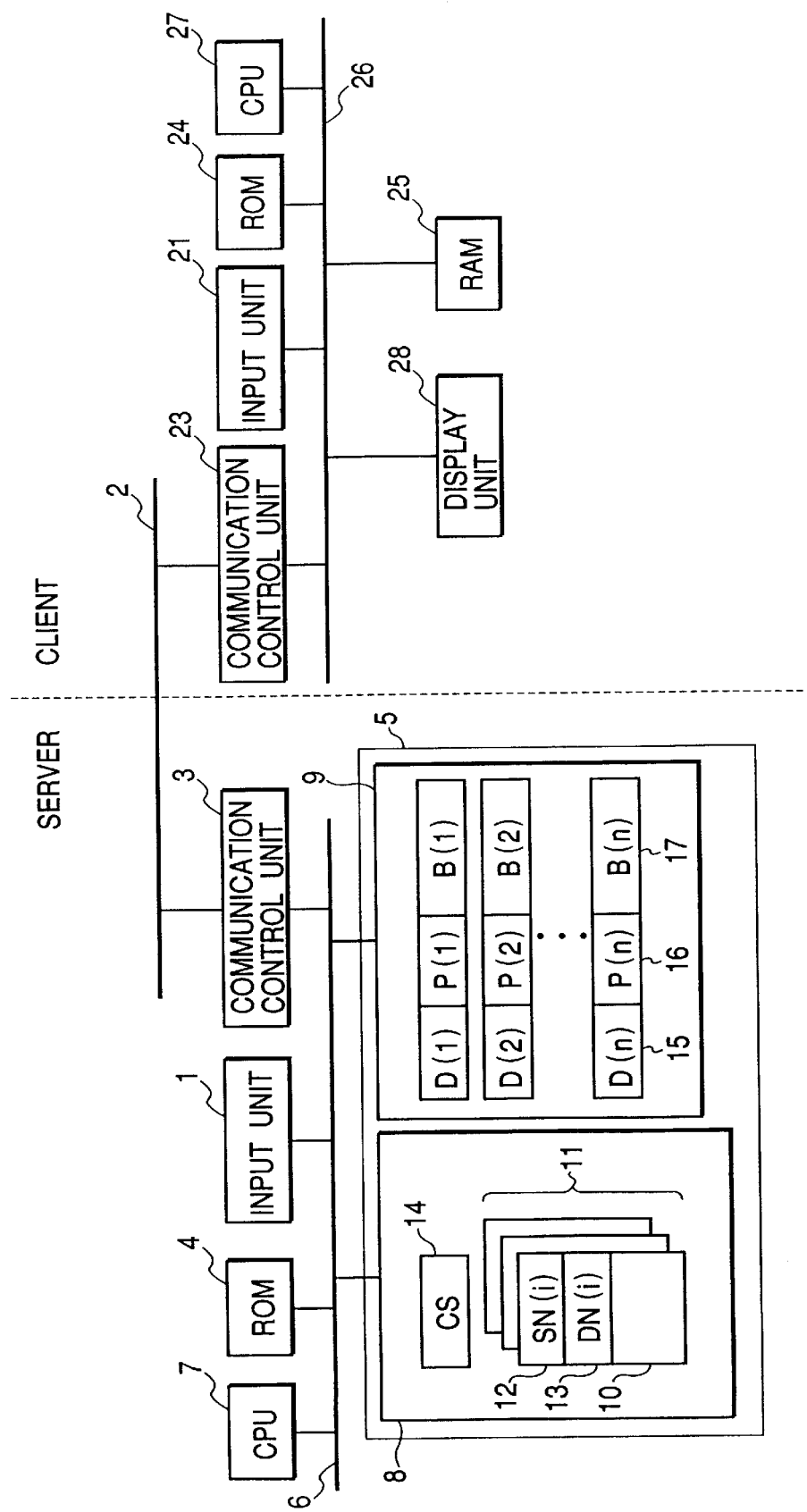
FIG. 1 is a block diagram showing a data transfer system of an embodiment.

FIG. 1 is a block diagram showing an embodiment of a data transfer system in accordance with the present invention. The server serving as a data transfer apparatus has: an input unit 1 such as a keyboard; a communication control unit 3 that controls communication with a network 2 such as an internet; a ROM 4 wherein a predetermined control program including a program for a processing procedure to be hereinafter described in conjunction with a flowchart has been stored; a RAM 5 used for temporarily storing computation results or used as a work area; and a CPU 7 that executes the program in the ROM 4 and is connected to the foregoing constituents via a bus 6 to control the entire apparatus. The server is connected to a client via the network 2 to transfer data to the client so as to provide services requested from the client.

The RAM 5 has a slot data storage area 8 for storing slot data (SL data) to, for example, respond to a request for connection to the client, and a document data storage area 9 for storing document data corresponding to the contents stored in the slot data storage area 8.

The slot data storage area 8 has a connection table 11 consisting of a plurality of slots (SL) 10 corresponding to the number of connection requests from the client, and each slot 10 has a slot number storage section 12 for storing a predetermined slot number SN (i) (i=1, 2, . . . , n) corresponding to a request from the client, and a first data number storing section 13 for storing a data number DN (i) (i=1, 2, . . . , n). The slot data storing area 8 further has a selected slot number storing section 14. A current slot number (CS) selected from the slots 10 stored in the connection table 11 is stored in the selected slot number storing section 14.

The document data storage area 9 has a second data number storing section 15 wherein a data number D (i) (i=1, 2, . . . , n) corresponding to the data number DN (i) in the first data number storing section 13 has been stored, a data significance storing section 16 wherein a priority of data P (i) (i=1, 2, . . . , n) is stored, and a data main body storing section 17 wherein a data main body B (i) (i=1, 2, . . . , n) such as document data or image data is stored. The data number D (i), the data priority P (i), and the data main body B (i) that are associated with each other are formed as a set, and a plurality of such sets are stored in sequence. It is assumed that the data priority P (i) has been set and stored beforehand when a user registers data in the server. To be more specific, the data priority P (i) in this embodiment is set such that the value of "i" is set to a greater number like 1, 2, . . . , n as the significance increases.

The client serving as a data receiving apparatus has: an input device 21 such as a keyboard; a communication control unit 23 that controls communication with the network 2 such as an internet; a ROM 24 wherein a predetermined control program including a program for a data display task processing procedure to be hereinafter described in conjunction with a flowchart has been stored; a RAM 25 used for temporarily storing computation results or received data or used as a work area; and a CPU 27 that executes the program in the ROM 24 and is connected to the foregoing constituents via a bus 26 to control the entire apparatus. The client is connected to the server via the network 2 to send requests for data to the server and to receive the data transferred from the server.

Figure 2:
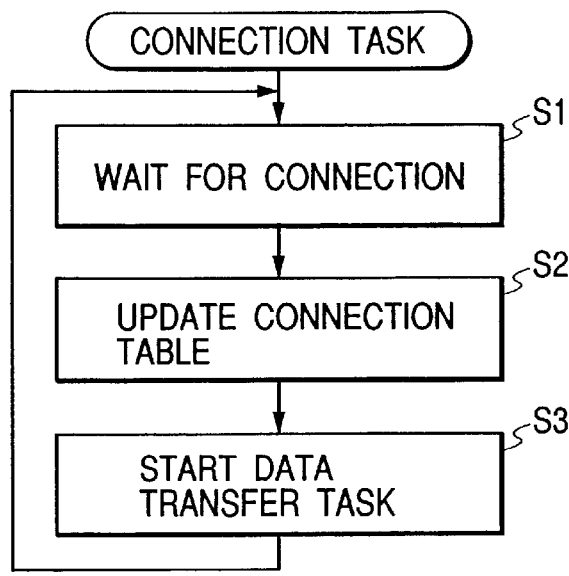
FIG. 2 is a flowchart illustrative of a connection task processing procedure.

FIG. 2 is a flowchart illustrative of a processing procedure for a connection task.

In a step S1, the server waits until it receives a connection request from the client. When the server is notified by the communication control unit 3 to the effect that the connection request has been received from the client, it updates the contents of the connection table 11 in a step S2. More specifically, when a new connection request is received from the client, a single empty slot 10 stored in the connection table 11 is allotted a slot number SN (i) and a data number DN (i) associated with the slot number SN (i), and stored in the connection table 11. Each slot 10 includes the address of the client and various other data such as a connection state.

Thus, after the connection table 11 has been updated, the server issues, in a step S3, a transfer service instruction to the data transfer task by means of inter-task communication based on a message or a signal. Then, the server returns to the step S1 to wait until it receives another new connection request from the client.

Figure 3:
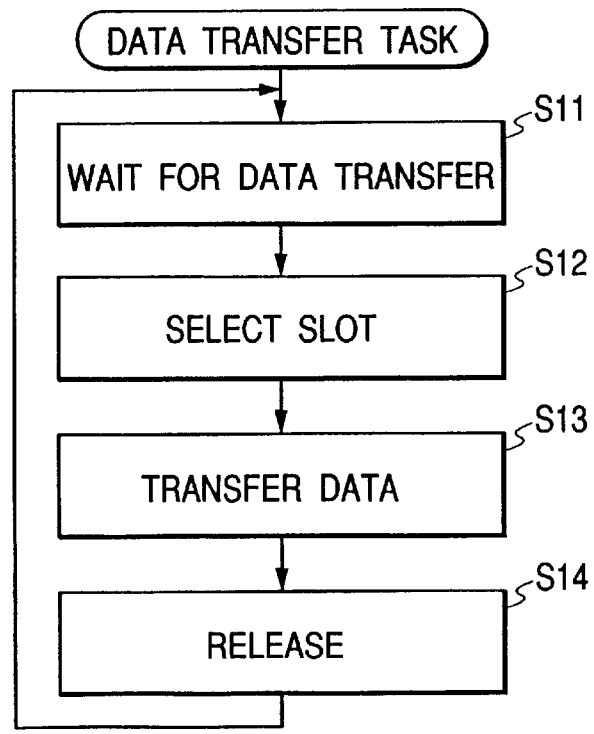
FIG. 3 is a flowchart illustrative of a processing procedure of a data transfer task in accordance with a first embodiment.

FIG. 3 is a flowchart illustrative of the processing procedure for the data transfer task in accordance with the first embodiment.

In a step S11, the server waits until it receives a data transfer instruction from the connection task (the step S3 of FIG. 2). When the server receives the data transfer instruction, it advances to a step S12 to select a slot number SN (i) of a high priority from the connection table 11. To be more specific, the server finds the data number DN (i) requested for each slot 10 stored in the connection table 11 from the first data number storing section 13, and finds the data number D (i) associated with the data number DN (i) from the second data number storing section 15 in the document data storage area 9 to select the data number D (i) associated with the P (i) of the highest data priority and the slot number SN (i) associated with the data number D (i). Then, the server stores the selected slot number SN (i) in the selected slot number storing section 14.

Subsequently, the server proceeds to a step S13 wherein it sends out the data main body B (i) corresponding to the slot number SN (i) stored in the slot number storing section 14 from the communication control unit 3 to the network 2 to transfer it to the client. In a step S14, the server releases or cuts the connection, then returns to the step S11 wherein it waits until it receives another new data transfer request from the connection task.

Thus, according to the first embodiment, the priorities are assigned in advance to the data stored in the server, and the data is transferred in sequence to the client according to the priorities, starting with the data with the highest priority.

Figure 4:
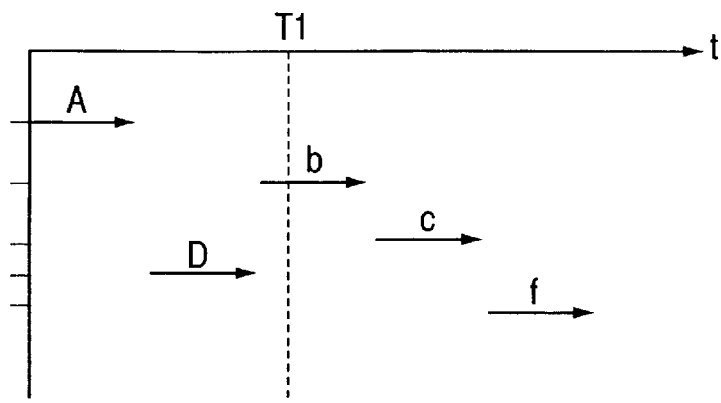
FIG. 4 is a diagram showing an example of a transfer order of the embodiment.
Figure 8:
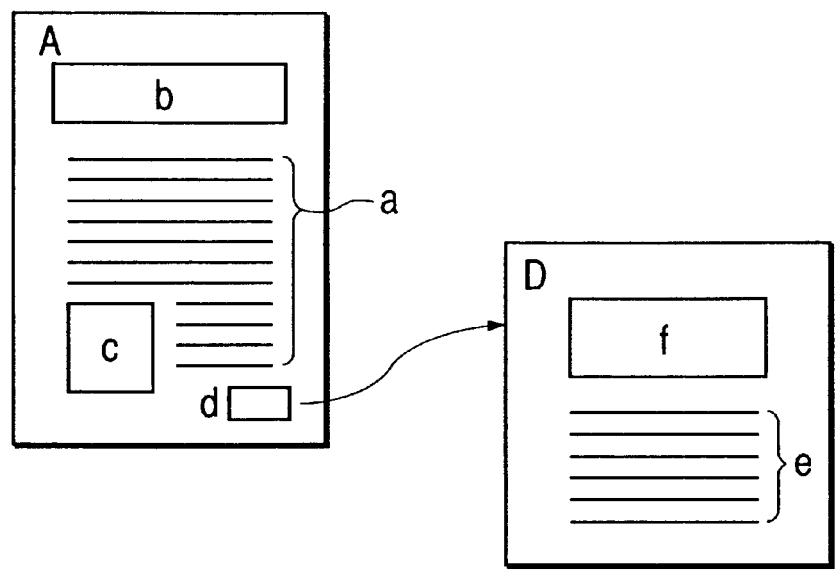
FIG. 8 is a diagram showing an example of the configuration of document data.
Figure 9:
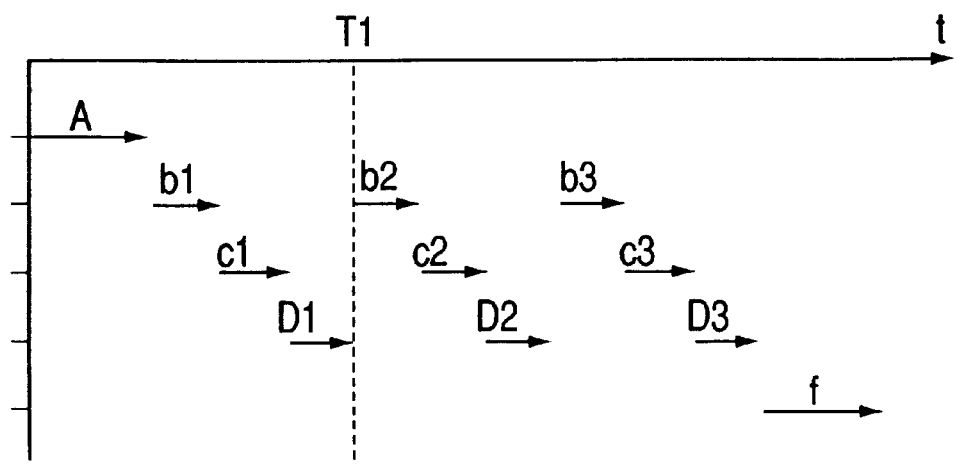
FIG. 9 is a diagram showing an example of a conventional transfer order.

For instance, to receive the document data of FIG. 8, the client first reads all the data contained in a page A, and analyzes the contents of the data to detect the presence of embedded objects b and c, and a link object d as in the case of the conventional art. The client then issues three connection requests at the same time to the server in order to read the embedded objects b and c stored in a separate file, and the data of a page D to which the link object d is linked. In this case, if the degrees of significance or the priorities have been set in the order of the page D, the embedded object b, and the embedded object c, then these data are transferred according to the order of their priorities as shown in FIG. 4. Hence, even if the line is disconnected at time T1, the user or the client can acquire the data in the page D with the highest priority before the time at which the disconnection occurred.

Therefore, if the embedded object b or c is unnecessary, then there will be no need for reconnection. Even if the embedded object b or c is necessary, there will be no need to reread all data requested at the same time as in the case of the conventional art since the data in the page D has already been obtained. This minimizes the efforts for rereading or the like, contributing greatly to improved convenience to the users.

Figure 5:
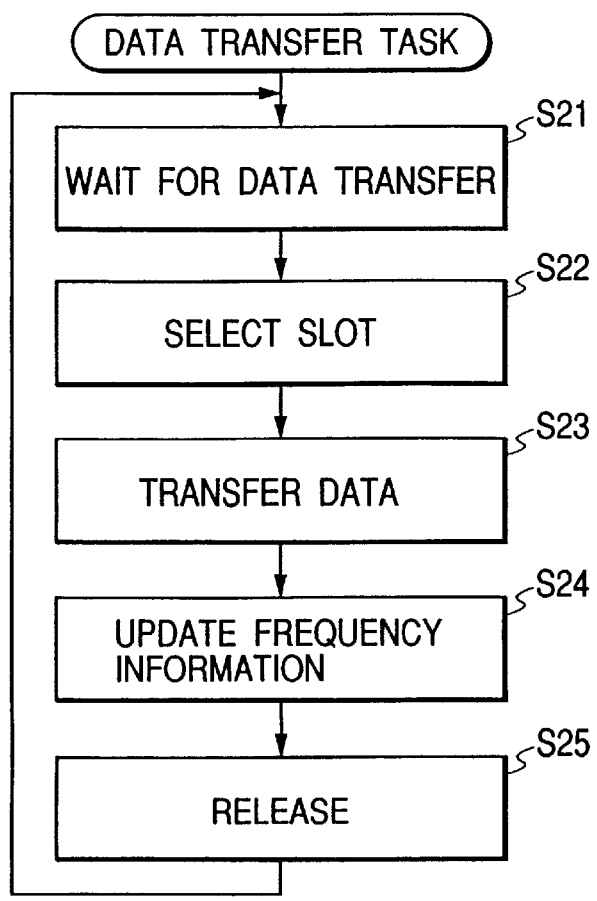
FIG. 5 is a flowchart illustrative of a processing procedure of a data transfer task in accordance with a second embodiment.

FIG. 5 is a flowchart illustrative of the processing procedure for the data transfer task in accordance with a second embodiment. In the first embodiment, the data priority P (i) is statically assigned and registered when the data is registered in the server. In the second embodiment, the data priority P (i) is dynamically assigned according to the operation status of the server; to be more specific, priorities are assigned according to the frequencies of transfer requests.

In the second embodiment, the data priority P (i) in the document data storage area 9 is initialized to, for example, "0" denoting the lowest significance, at the time of registering data in the server.

In steps S21 through S23, the server carries out the same processing as that in the steps S11 through S13 of FIG. 3 and transfers data to the client. In the following step S24, the information regarding the frequency is updated. In this case, the transferred data D (i) is the data that has been transferred in response to an actual request for the data; therefore, it is determined that the priority has been increased, and the data priority P (i) is updated by adding 1, namely, P (i)+1. After updating the information regarding the frequency, the server releases or disconnects the line in a step S25, then returns to the step S21.

According to the second embodiment, the priority of data that is requested by the client more frequently is set to a greater value, thereby enabling the data with higher request frequencies to be preferentially transferred. With this arrangement, the priorities can be set according to the current state while checking the operational state, thus obviating the need of statically presetting the priorities.

Figure 6:
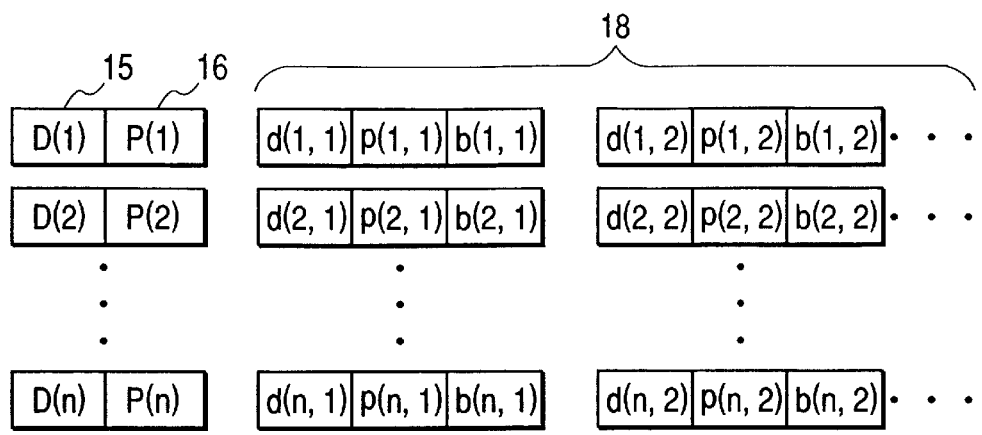
FIG. 6 is a diagram showing the configuration of major data in a document data storage area in accordance with a third embodiment.

FIG. 6 shows the configuration of major data in the document data storage area 9 in accordance with a third embodiment. In this figure, it is assumed that the data size is large. A data main body 18 has been subdivided, and each piece of data resulting from the subdivision is independently assigned a priority. To be more specific, in the third embodiment, a subdivided data number d (i, j) (i=1, . . . n; j=1, . . . m), a priority of subdivided data p (i, j) (i=1, . . . n; j=1, . . . m), and a subdivided data main body b (i, j) (i=1, . . . n; j=1, . . . m) are assigned to the data number D (i) and the data priority P (i), respectively.

As the data size is increased, variations tend to take place in the priority. Normally, however, the data for one object is likely to be stored in one file; therefore, one piece of data cannot be divided, causing data not required by the user to be inevitably transferred in some cases. On the other hand, document data is usually composed of paragraphs, chapters, sections, etc., and information can be identified by means of these paragraphs, chapters, sections, etc. This makes it possible to subdivide, for example, document data in units of paragraphs. In the third embodiment, therefore, each datum is subdivided, a data priority is assigned to each subdivided data, and data with higher priorities is transferred preferentially to the client, thus achieving further improved convenience for the client.

To subdivide data, there is a method available whereby the data is automatically subdivided, and the subdivided data numbers d (i, j) and the subdivided data priorities p (i, j) are assigned by embedding the subdivided data numbers d (i, j) and the subdivided data priorities p (i, j) in the data itself beforehand, or by running a parser program that analyzes the structure of a prepared document.

The procedure for the connection to the client and the procedure for transferring data to the client are the same as those of the first and second embodiments, and the description thereof will not be repeated.

Figure 7:
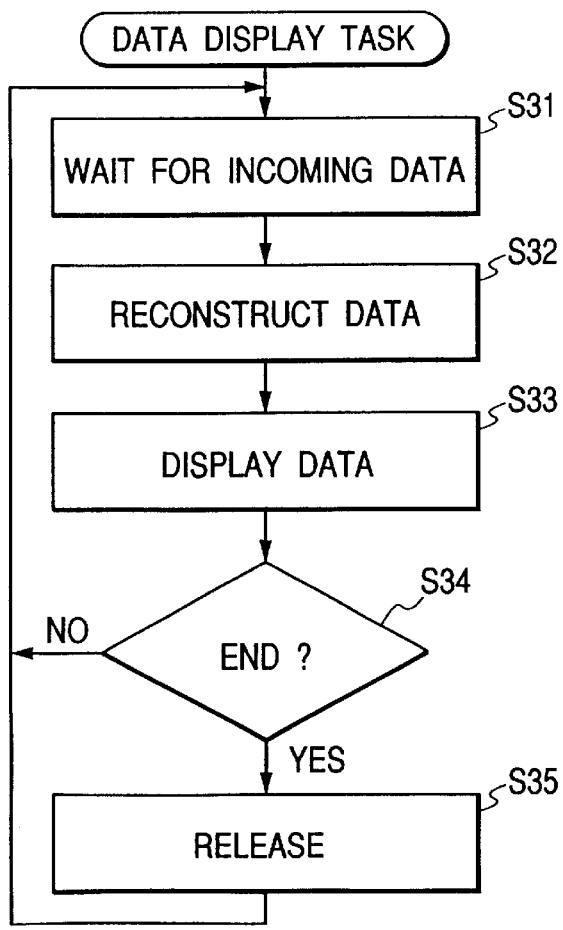
FIG. 7 is a flowchart illustrative of a processing procedure of a data display task in accordance with the third embodiment.

FIG. 7 is a flowchart illustrative of the processing procedure for the data display task in accordance with the third embodiment. As shown in the flowchart of FIG. 7, in the third embodiment, received data is reconstructed on the client side and displayed on a screen.

First, in a step S31, the client waits for incoming data from the server. Upon receipt of data, the server reconstructs the data in a step S32. More specifically, the subdivided data that has been transferred according to the priority order is rearranged in a proper order according to the subdivided data numbers d (i, j). In a step S33, the rearranged data is shown on a display screen.

Subsequently, in a step S34, the client determines whether the data received is the last data or not. If the determination result is negative (No), then the client returns to the step S31 to repeat the aforesaid processing; or if the determination result is affirmative (Yes), then it advances to a step S35 to disconnect the line. After the client returns to the step S31, it waits for another data from the server.

For instance, if the data number of the subdivided data transferred first to the client is the data of the third paragraph, then it means that the data of the first and second paragraphs has not yet been transferred; hence, only the data of the third paragraph is shown on the display screen. When the data of the first paragraph is received, the paragraph data is reconstructed to so that the data of the first paragraph is displayed before the data of the third paragraph, and the reconstruction result is shown on the display screen. In this way, the data of the first paragraph is shown first on the display screen, then the data of the third paragraph is shown on the display screen.

Thus, according to the third embodiment, the client is allowed to quickly obtain the data of a desired page regardless of the transfer order of the contents of a document, by reconstructing the data each time new subdivided data arrives.

As explained in detail above, the embodiment is adapted to assign priorities to data and the data is transferred in order of precedence, enabling the user to more quickly refer to the data that the client is more interested in. Furthermore, even if the line is disconnected in the middle of data transfer, the need of reconnection for rereading can be minimized, contributing to improved convenience for the user.

The present invention may be applied to a system constructed of a plurality of units (e.g. a computer main unit, an interface, a display, and so on) or to an apparatus constructed of a single unit, within the range where the functions of the foregoing embodiments can be implemented.

The present invention also includes a modification wherein, in order to operate various devices to implement the functions of the foregoing embodiments, the program codes of software for implementing the functions of the embodiments are supplied to a computer in an apparatus or a system connected to the various devices, and the various devices are operated by the computer (or a CPU or MPU) of the system or the apparatus in accordance with the supplied program. In this case, the program codes themselves read out from a storage medium carry out the functions of the embodiments; hence, the program codes themselves, and the means for supplying the program codes to the computer, e.g. the storage medium for storing the program codes, constitute the present invention.

Storage medium for supplying the program codes includes a floppy disk, a hard disk, an optical disk, a magneto-optical disk, a CD-ROM, a CD-R, a magnetic tape, a nonvolatile memory card, and a ROM.

It is needless to say that, when the computer executes the program codes that it reads to implement the functions of the embodiments, or when the functions of the embodiments are implemented in cooperation with an operating system (OS) running on the computer or other application software or the like in accordance with the instructions of the program codes, the program codes are included in the scope of the present invention.

Further, the present invention scope also includes a case wherein program codes read out from a storage medium are written to a memory provided on a feature expansion board inserted in a computer or a feature expansion unit connected to the computer, then a CPU or the like provided on the feature expansion board or the feature expansion unit carries out a part or all of actual processing in accordance with the instructions of the program codes so as to implement the functions of the embodiments.

To apply the present invention to the foregoing storage medium, the program code corresponding to the flowcharts, which have been discussed above, may be stored in the storage medium.

Although the present invention has been described in its preferred form with a certain degree of particularity, many apparently widely different embodiments of the invention can be made without departing from the spirit and the scope thereof. It is to be understood that the invention is not limited to the specific embodiments thereof except as defined in the appended claims.

What is claimed is:

1. A data transfer apparatus for transferring data to a terminal connected thereto via a network, comprising:

priority setting means for initially assigning a degree of priority to each of a plurality of transferable data;

selection means for selecting a data of a highest degree of priority from among a plurality of data for which transfer requests have issued;

transfer means for transferring the data selected by said selection means prior to transfer of other data of the plurality of data to the terminal item by item via the network; and priority updating means for increasing the degree of priority of the data transferred by said transfer means.

2. A data transfer apparatus according to claim 1, wherein said priority setting means respectively sets the degrees of priority at a time of registering of the plurality of transferable data.

3. A data transfer apparatus according to claim 1, wherein said priority setting means divides each item of data of the plurality of transferable data into predetermined data units to create divided data, and assigns a degree of priority independently to each item of the divided data that has been created.

4. A data transfer method for transferring data from a data transfer apparatus to a terminal via a network, comprising the steps of:

initially assigning a degree of priority to each of a plurality of transferable data;

selecting a data of a highest degree of priority from among the plurality of data for which transfer requests have issued;

transferring the data selected in said selecting step prior to transfer of other data of the plurality of data to the terminal item by item via the network; and increasing the degree of priority of the data transferred in said transferring step.

5. A data transfer method according to claim 4, wherein the degrees of priority for the plurality of transferable data are set at a registration time.

6. A data transfer method according to claim 4, wherein each item of data of the plurality of transferable data is divided into predetermined data units to create divided data, and a degree of priority is assigned independently to each item of the divided data.

7. A data transfer method according to claim 6, wherein the plurality of transferable data is reconstructed from items of the divided data each time an item of the divided data is received in sequence, and a reconstruction result is displayed at a terminal receiving the items of the divided data.

8. A computer-readable storage medium storing a data transfer program for controlling a data transfer apparatus to perform data transfer to a terminal via a network, the program comprising codes for causing a computer to perform the steps of:

initially assigning a degree of priority to each of a plurality of transferable data;

selecting a data of a highest degree of priority from among a plurality of data for which transfer requests have issued;

transferring the data selected in said selecting step prior to transfer of other data of the plurality of data to the terminal item by item via the network; and increasing the degree of priority of the data transferred in said transferring step.

9. An information processing system comprising a data transfer apparatus and a terminal connected via a network, wherein:

said data transfer apparatus comprises:

priority setting means for initially assigning a degree of priority to each of a plurality of transferable data;

selection means for selecting a data of a highest degree of priority from among a plurality of data for which transfer requests have issued;

transfer means for transferring the data selected by the selection means prior to transfer of other data of the plurality of data to the terminal item by item via the network; and priority updating means for increasing the degree of priority of the data transferred by the transfer means, and said terminal comprises:

requesting means for issuing a request for transfer of data to said data transfer apparatus; and receiving means for receiving data transferred from said data transfer apparatus.

10. An information processing system according to claim 9, wherein said priority setting means divides each item of data of the plurality of transferable data into predetermined data units to create divided data, and assigns a degree of priority independently to each item of divided data that has been created.

11. An information processing system according to claim 10, wherein said terminal further comprises reconstructing means for reconstructing the plurality of transferable data from received items of the divided data each time an item of the divided data is received in sequence by said receiving means, and displaying means for displaying a reconstruction result provided by said reconstructing means.

* * * * *